US012687767B2

(12) United States Patent
Tong et al.

(10) Patent No.: US 12,687,767 B2
(45) Date of Patent: Jul. 21, 2026

(54) CAMERA ASSEMBLY AND ELECTRONIC DEVICE

(71) Applicant: VIVO MOBILE COMMUNICATION CO., LTD., Guangdong (CN)

(72) Inventors: Hui Tong, Guangdong (CN); Yuyang Shen, Guangdong (CN); Zuokun Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 211 days.

(21) Appl. No.: 18/639,175

(22) Filed: Apr. 18, 2024

(65) Prior Publication Data

US 2024/0264512 A1 Aug. 8, 2024

Related U.S. Application Data

(63) Continuation of application No. PCT/CN2022/125617, filed on Oct. 17, 2022.

(30) Foreign Application Priority Data

Oct. 22, 2021 (CN) .......................... 202111234445.2

(51) Int. Cl.
*G03B 17/56* (2021.01)
*F16M 13/02* (2006.01)

(52) U.S. Cl.
CPC ......... *G03B 17/561* (2013.01); *F16M 13/022* (2013.01)

(58) Field of Classification Search
CPC .......................... G03B 17/56–566; H04N 23/51
See application file for complete search history.

(56) References Cited

U.S. PATENT DOCUMENTS 5,502,598 A * 3/1996 Kimura .............. A61B 1/00183
359/830
6,734,914 B1 * 5/2004 Nishimura ............. H04N 23/50
348/E5.025
(Continued)

FOREIGN PATENT DOCUMENTS

CN        206788527 U     12/2017
CN        110312014 A     10/2019
(Continued)

OTHER PUBLICATIONS

Sang et al, "Electric Magnetic Driving Mechanism Design and Performance Analysis of a Spherical Robot", Journal of East China University of Science and Technology (Natural Science Edition), vol. 37 No. 6, Dec. 2011.

*Primary Examiner* — Leon W Rhodes, Jr.
(74) *Attorney, Agent, or Firm* — Price Heneveld LLP

(57) ABSTRACT

This application discloses a camera assembly and an electronic device. The camera assembly includes a bracket body, a spherical part, a first driving mechanism, and a camera. The bracket body is provided with an accommodation space. The spherical part is at least partially located in the accommodation space. The camera is disposed on the spherical part. The first driving mechanism is provided in plurality, the plurality of first driving mechanisms being spaced apart along a circumferential direction of the spherical part. The first driving mechanism includes a rolling element and a driving source. The driving source is disposed on the bracket body. The driving source is connected to the rolling element, and the driving source drives the rolling element to rotate. The rolling element is in contact with a spherical surface of the spherical part and rolls relative to the spherical surface.

14 Claims, 11 Drawing Sheets

(56)  References Cited

U.S. PATENT DOCUMENTS

| | | | |
|---|---|---|---|
| 10,976,647 B2 * | 4/2021 | Liao ........................ | G03B 17/12 |
| 2009/0297137 A1 * | 12/2009 | Entis ...................... | G03B 17/02 |
| | | | 396/428 |
| 2010/0247090 A1 * | 9/2010 | Fang ........................ | H04N 5/64 |
| | | | 396/428 |
| 2012/0188441 A1 | 7/2012 | Takizawa | |
| 2014/0354833 A1 | 12/2014 | Takizawa et al. | |
| 2017/0118411 A1 | 4/2017 | Morinaga | |
| 2022/0407997 A1 | 12/2022 | Zhang et al. | |
| 2023/0262326 A1 | 8/2023 | Shi | |
| 2023/0328376 A1 | 10/2023 | An et al. | |

FOREIGN PATENT DOCUMENTS

| | | | |
|---|---|---|---|
| CN | 111212209 A | 5/2020 |
| CN | 211529123 U | 9/2020 |
| CN | 112261266 A | 1/2021 |
| CN | 112311993 A | 2/2021 |
| CN | 112492173 A | 3/2021 |
| CN | 112702484 A | 4/2021 |
| CN | 112822352 A | 5/2021 |
| CN | 112822353 A | 5/2021 |
| CN | 113014779 A | 6/2021 |
| CN | 113099104 A | 7/2021 |
| CN | 113163080 A | 7/2021 |
| CN | 213880006 U | 8/2021 |
| CN | 113873164 A | 12/2021 |
| JP | 2016071202 A | 5/2016 |
| JP | 2017173757 A | 9/2017 |
| JP | 2017181675 A | 10/2017 |
| WO | 2021057646 A1 | 4/2021 |

* cited by examiner

161

1611

162  1621

CAMERA ASSEMBLY AND ELECTRONIC DEVICE

CROSS-REFERENCE TO RELATED APPLICATIONS

This application is a Bypass continuation application of PCT International Application No. PCT/CN2022/125617 filed on Oct. 17, 2022, which claims priority to Chinese patent application No. 202111234445.2, filed on Oct. 22, 2021, which are incorporated herein by reference in their entireties.

TECHNICAL FIELD

This application pertains to the field of communications device technologies, and specifically to a camera assembly and an electronic device.

BACKGROUND

With advancement of technologies, electronic devices (such as mobile phones and tablet computers) have made significant progress. As a powerful tool, an electronic device greatly facilitates life and work of users. Camera shooting is a basic function of the electronic device, which can meet users' needs for shooting. Camera shooting is typically implemented by a camera module of the electronic device.

However, a user usually holds an electronic device in hand to take pictures, which can lead to poor quality of pictures taken by the electronic device due to shaking during hand-held shooting.

SUMMARY

Embodiments of this application are intended to provide a camera assembly and an electronic device.

This application is implemented as follows.

An embodiment of this application provides a camera assembly including a bracket body, a spherical part, a first driving mechanism, and a camera.

The bracket body is provided with an accommodation space. The spherical part is at least partially located in the accommodation space. The camera is disposed on the spherical part.

The first driving mechanism is provided in plurality, the plurality of first driving mechanisms being spaced apart along a circumferential direction of the spherical part. The first driving mechanism includes a rolling element and a driving source. The driving source is disposed on the bracket body, the driving source is connected to the rolling element, and the driving source drives the rolling element to rotate. The rolling element is in contact with a spherical surface of the spherical part and rolls relative to the spherical surface.

The rolling elements of the first driving mechanisms disposed opposite each other rotate in opposite directions, the first driving mechanisms disposed opposite each other drive the spherical part to rotate, and the spherical part drives the camera to rotate.

An embodiment of this application further provides an electronic device including the foregoing camera assembly.

DESCRIPTION OF REFERENCE SIGNS

Figure 1:
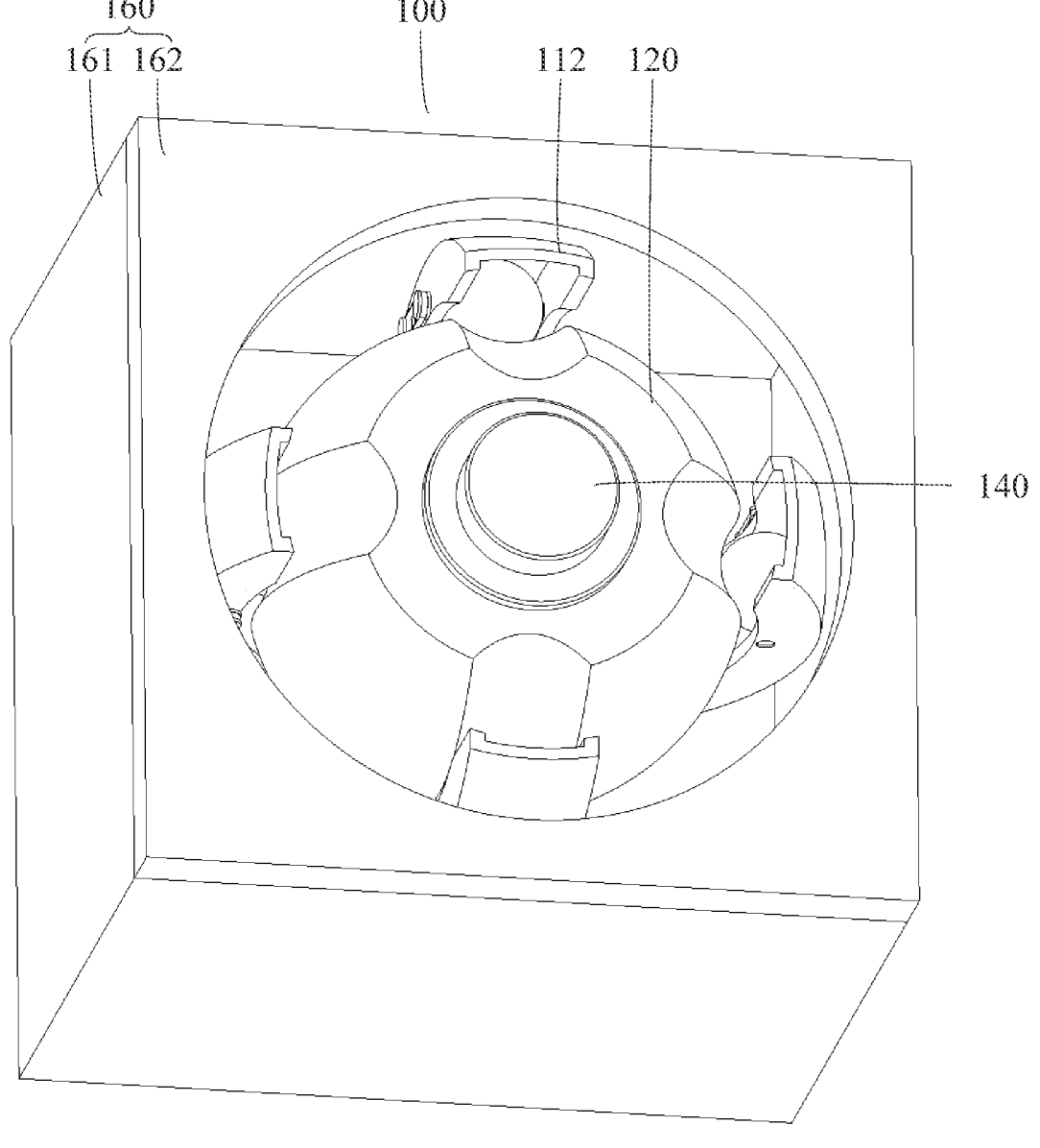
FIG. 1 is a schematic structural diagram of a camera assembly according to an embodiment of this application.
Figure 2:
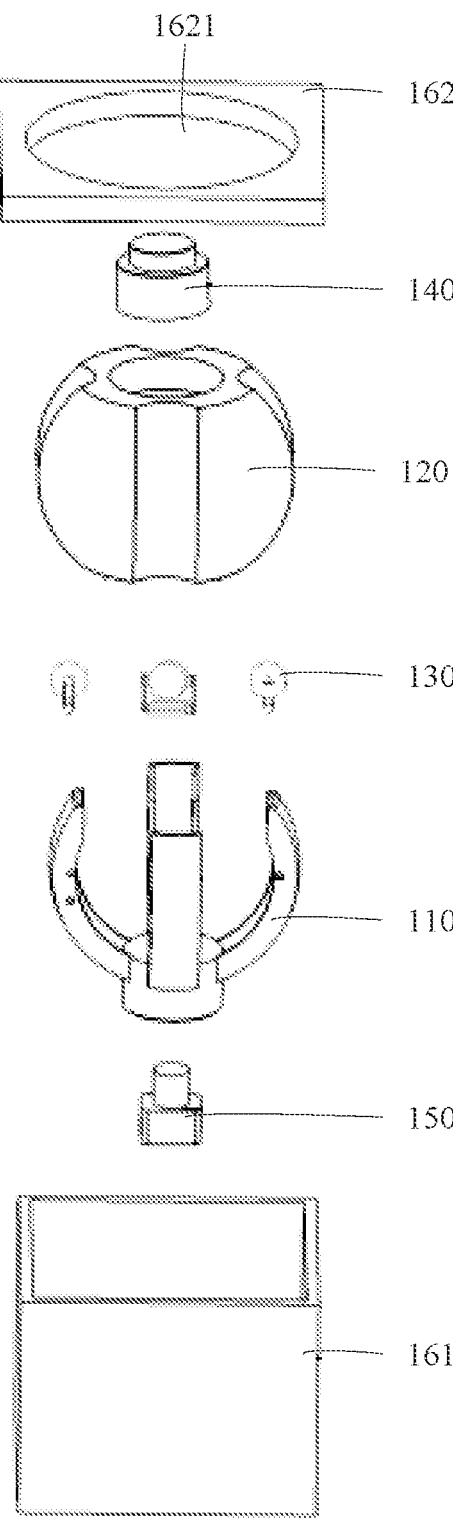
FIG. 2 is an exploded view of a camera assembly according to an embodiment of this application.

100: camera assembly, 110: bracket body, 111: supporting part, 112: arc-shaped extension part, 1121: accommodation groove, 1121*a*: first mounting hole, 1121*b*: second mounting hole, 120: spherical part, 121: first plane, 122: second plane, 123: spherical surface, 1231: arc-shaped guide groove, 124: accommodation space, 130: first driving mechanism, 131: rolling element, 132: driving source, 133: transmission belt, 134: rotating shaft, 140: camera, 150: second driving mechanism, 160: module housing, 161: base, 1611: third mounting hole, 162: top cover, and 1621: through hole.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the data so used may be interchanged under appropriate situations so that the embodiments of this application can be implemented in an order other than those illustrated or described herein. In addition, "and/or" in the specification and claims represents at least one of connected objects, and the character "/" generally indicates that the associated objects have an "or" relationship.

The following describes in detail the camera assembly provided in the embodiments of this application through specific embodiments and application scenarios thereof with reference to the accompanying drawings.

Refer to FIG. 1 to FIG. 12. An embodiment of this application discloses a camera assembly 100. The camera assembly 100 disclosed includes a bracket body 110, a spherical part 120, a first driving mechanism 130, and a camera 140.

The bracket body 110 provides a foundation for mounting other components of the camera assembly 100. The bracket body 110 is provided with an accommodation space 124. The spherical part 120 is at least partially located in the accommodation space 124. The camera 140 is disposed on the spherical part 120. The camera 140 is configured to shoot pictures.

The first driving mechanism 130 is provided in plurality. The plurality of first driving mechanisms 130 are spaced apart along a circumferential direction of the spherical part 120. The first driving mechanism 130 includes a rolling element 131 and a driving source 132. The driving source 132 is disposed on the bracket body 110. The driving source 132 is connected to the rolling element 131, and the driving source 132 drives rotation of the rolling element 131. The rolling element 131 is in contact with a spherical surface 123 of the spherical part 120 and rolls relative to the spherical surface 123.

The rolling elements 131 of the first driving mechanisms 130 disposed opposite each other rotate in opposite directions. The first driving mechanisms 130 disposed opposite each other drive the spherical part 120 to rotate, and the spherical part 120 drives the camera 140 to rotate.

In the foregoing solution, the rolling elements 131 move relative to the spherical surface 123. Because the rolling elements 131 are fastened at specific positions and can only rotate, the friction between the rolling elements 131 and the spherical surface 123 drives the spherical part 120 to rotate. A rotation axis of the spherical part 120 is perpendicular to a line connecting centers of two opposite rolling elements 131, and the rotation axis of the spherical part 120 passes through a center of the line connecting centers of the two opposite rolling elements 131, that is, a center of the spherical part 120.

In the foregoing embodiment, the rolling elements 131 disposed opposite each other can clamp the spherical part 120. In other words, the spherical part 120 is fastened in a suspended manner via the rolling elements 131 disposed opposite each other.

In this embodiment disclosed in this application, the two opposite rolling elements 131 can rotate in opposite directions. In this case, the rolling elements 131 rotate relative to the spherical surface 123, so that the rolling elements 131 can drive rotation of the spherical part 120, which in turn enables the spherical part 120 to drive rotation of the camera 140. The spherical part 120 can drive rotation of the camera 140, so as to compensate for the shaking amount of the camera 140, so that an anti-shake function can be implemented, thereby improving picture shooting quality of an electronic device.

In addition, the spherical surface 123 of the spherical part 120 has a relatively large curvature, so the rolling elements 131 can move a relatively long distance relative to the spherical surface 123, which achieves a relatively large range of anti-shake angle for the camera 140, thereby improving the anti-shake performance of the camera 140.

Further, in the technical solution of this application, anti-shaking of the camera 140 is implemented in a mechanical driving manner. Compared with an electromagnetic driving manner, this driving manner is free from electromagnetic interference, so components of the camera 140 are not easily affected by magnetization or the like, thereby improving safety and reliability of the camera 140.

In a specific anti-shake process of the foregoing camera assembly 100, when a gyroscope in the electronic device or the camera 140 detects a tilt of the camera 140, the gyroscope obtains data such as the tilt angle of the camera 140 and transmits it to a control chip. The control chip inputs a corresponding angle compensation value, and the control chip controls the corresponding first driving mechanism 130 to rotate, which in turn drives the spherical part 120 to rotate. The spherical part 120 drives rotation of the camera 140 to implement angle compensation, thereby implementing the anti-shake function of the camera 140.

Figure 3:
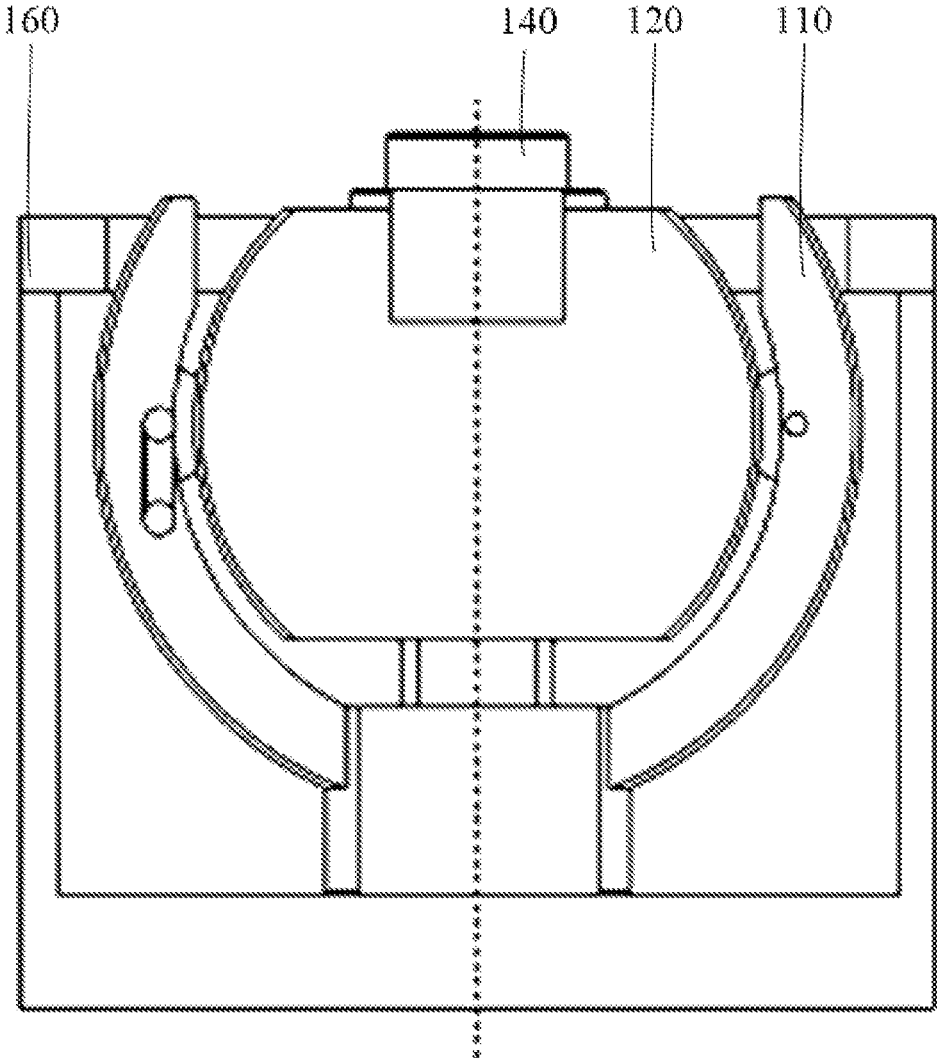
FIG. 3 is a sectional view of a camera assembly according to an embodiment of this application.
Figure 4:
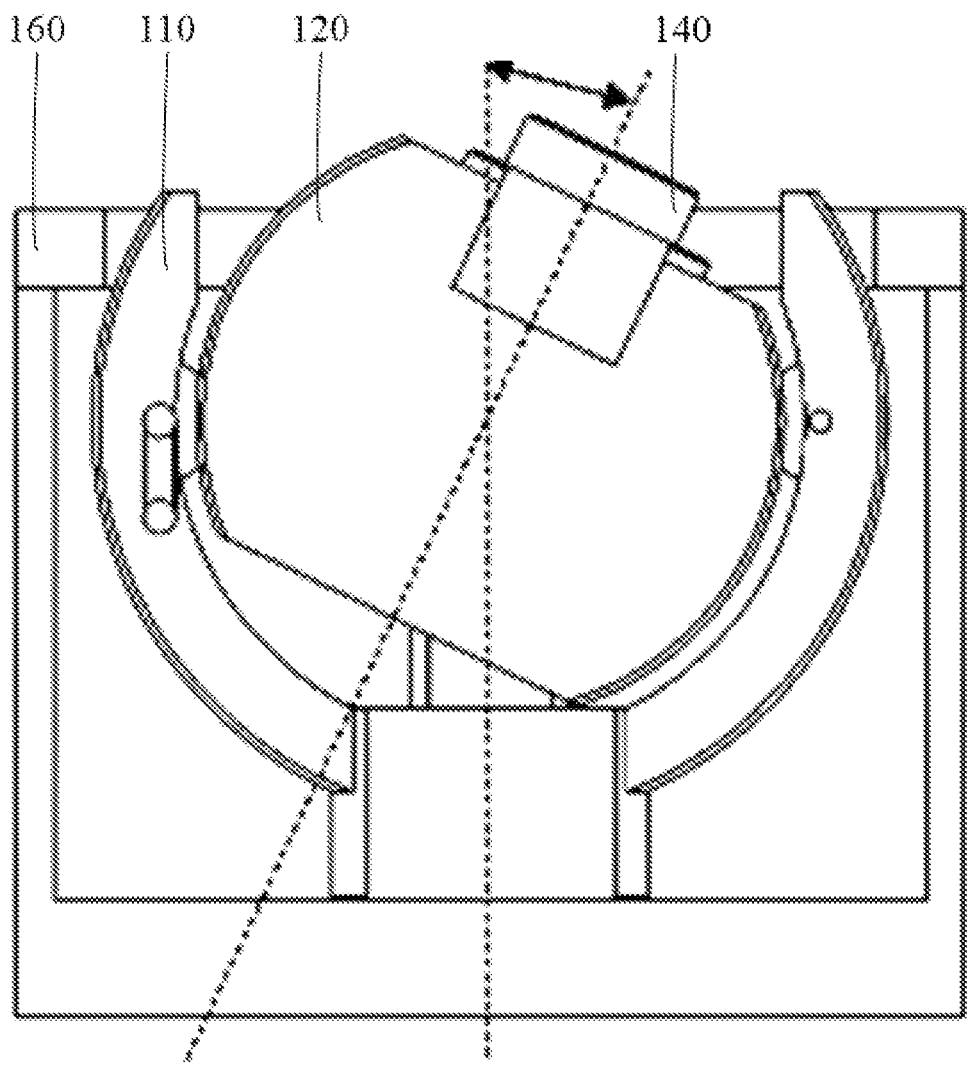
FIG. 4 and FIG. 5 are sectional views of a camera assembly in an anti-shake state according to an embodiment of this application.
Figure 5:
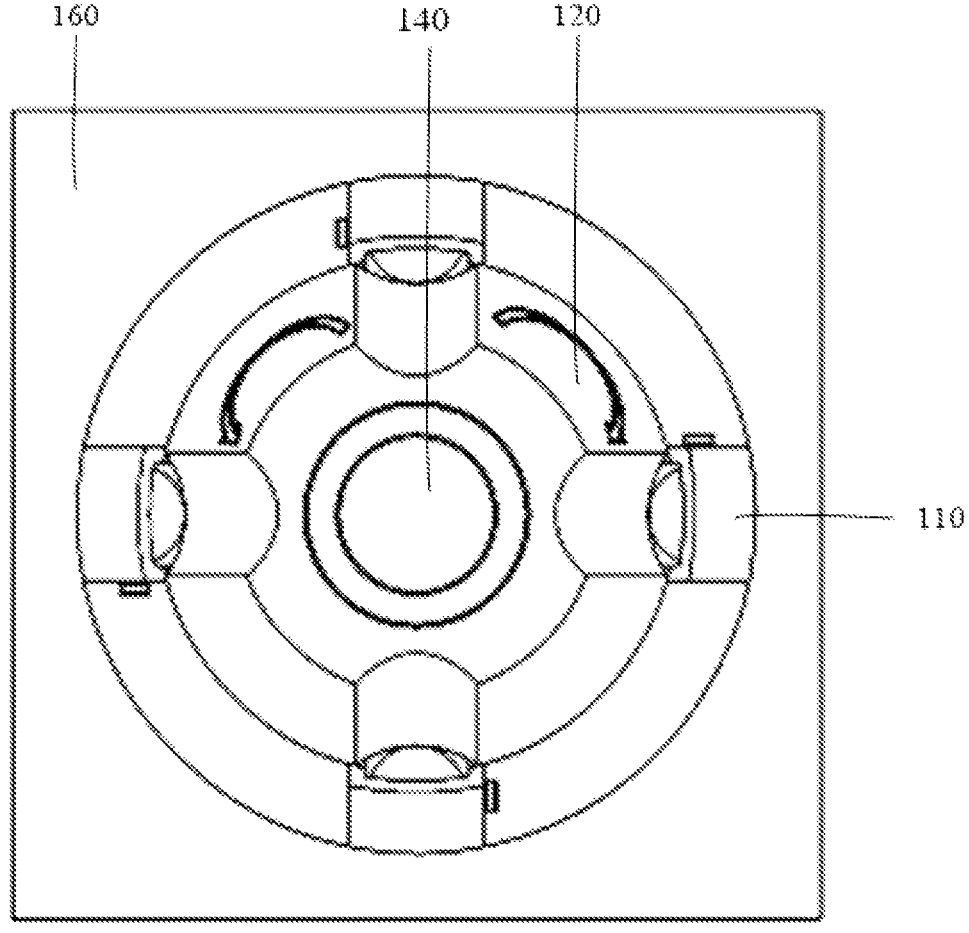
Figure 6:
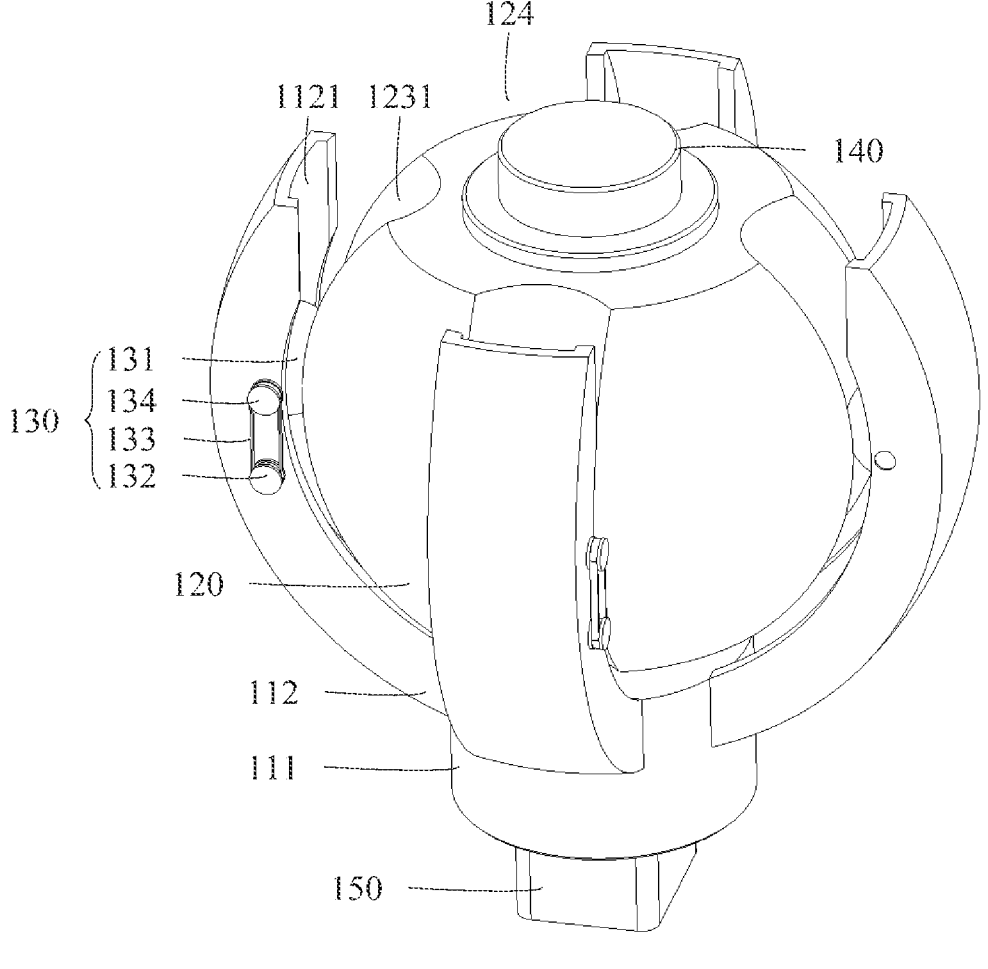
FIG. 6 to FIG. 8 are schematic structural diagrams of some components of a camera assembly according to an embodiment of this application.
Figure 7:
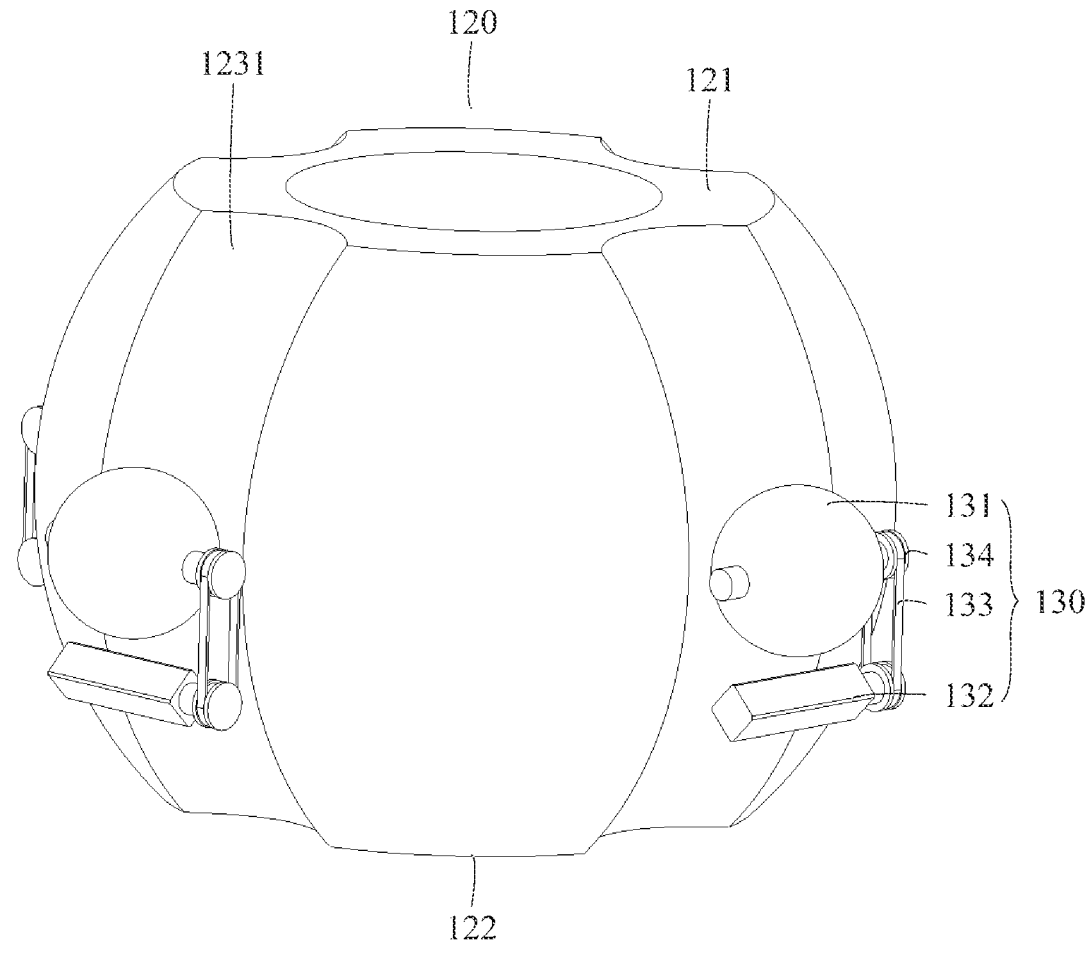
Figure 8:
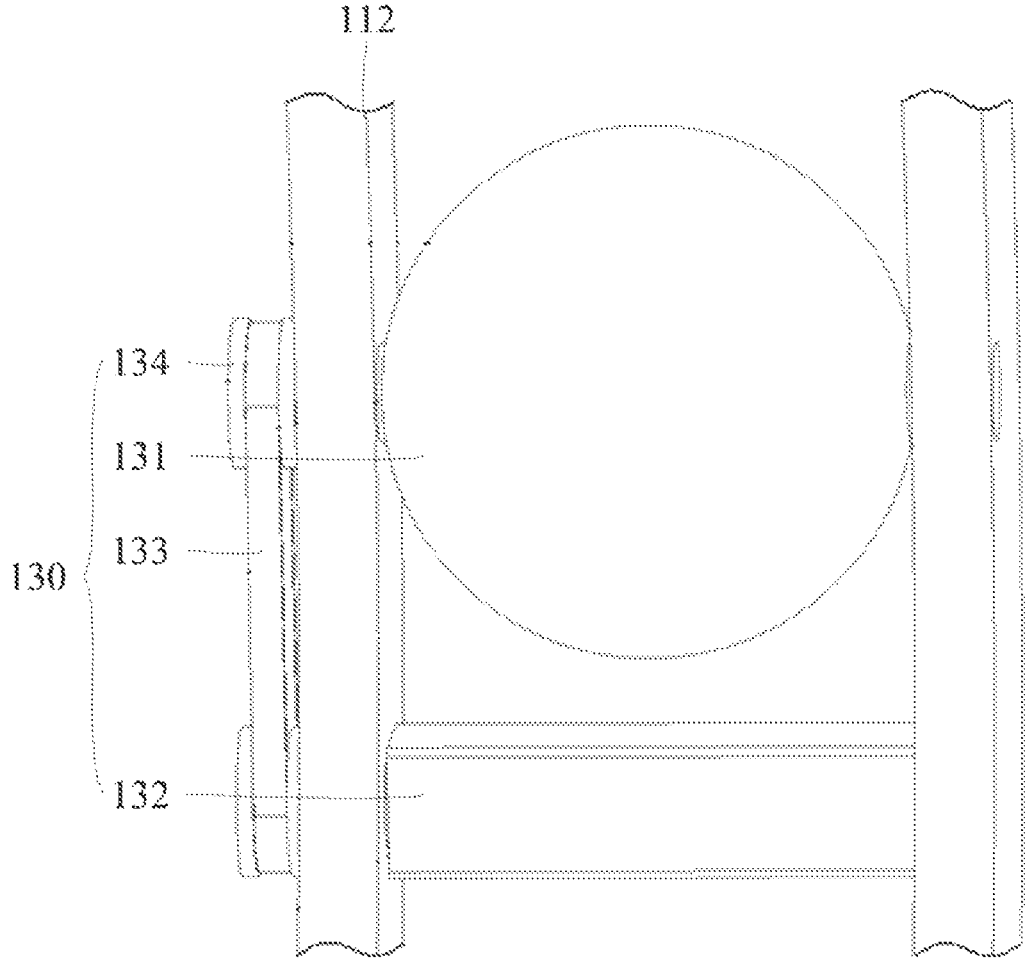
Figure 9:
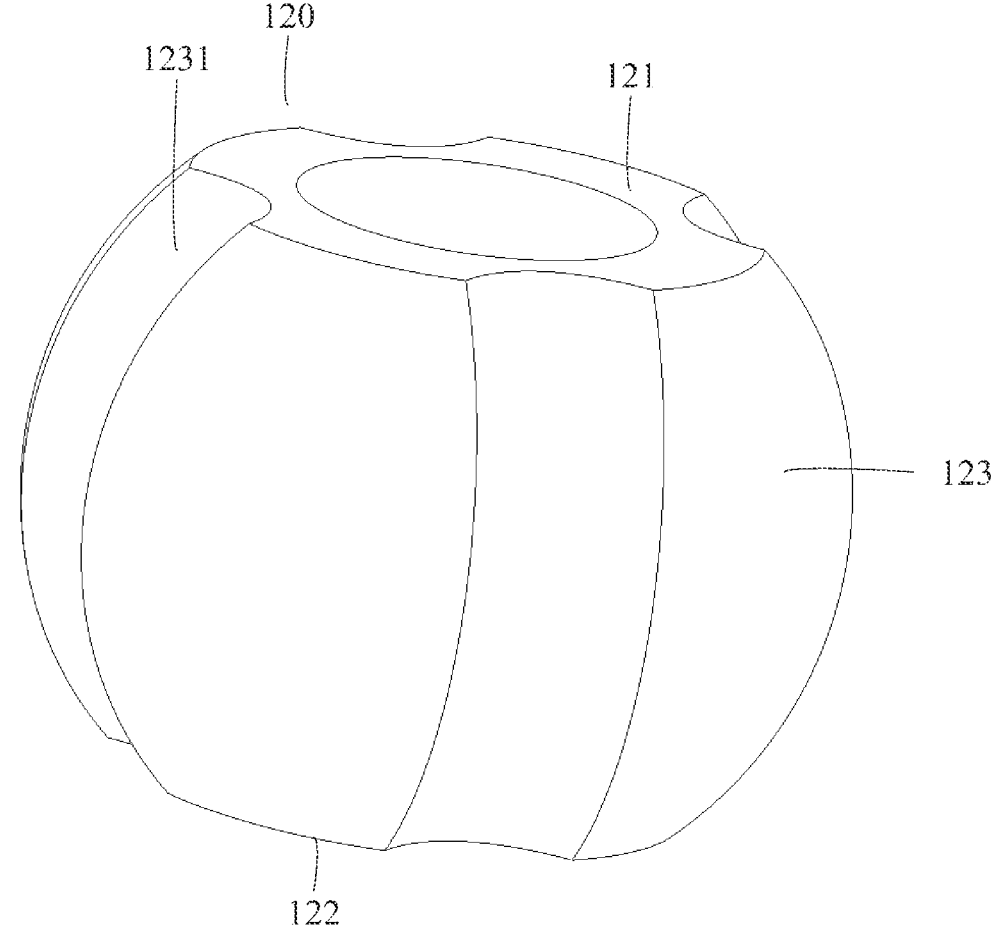
FIG. 9 is a schematic structural diagram of a spherical part of a camera assembly according to an embodiment of this application.
Figure 10:
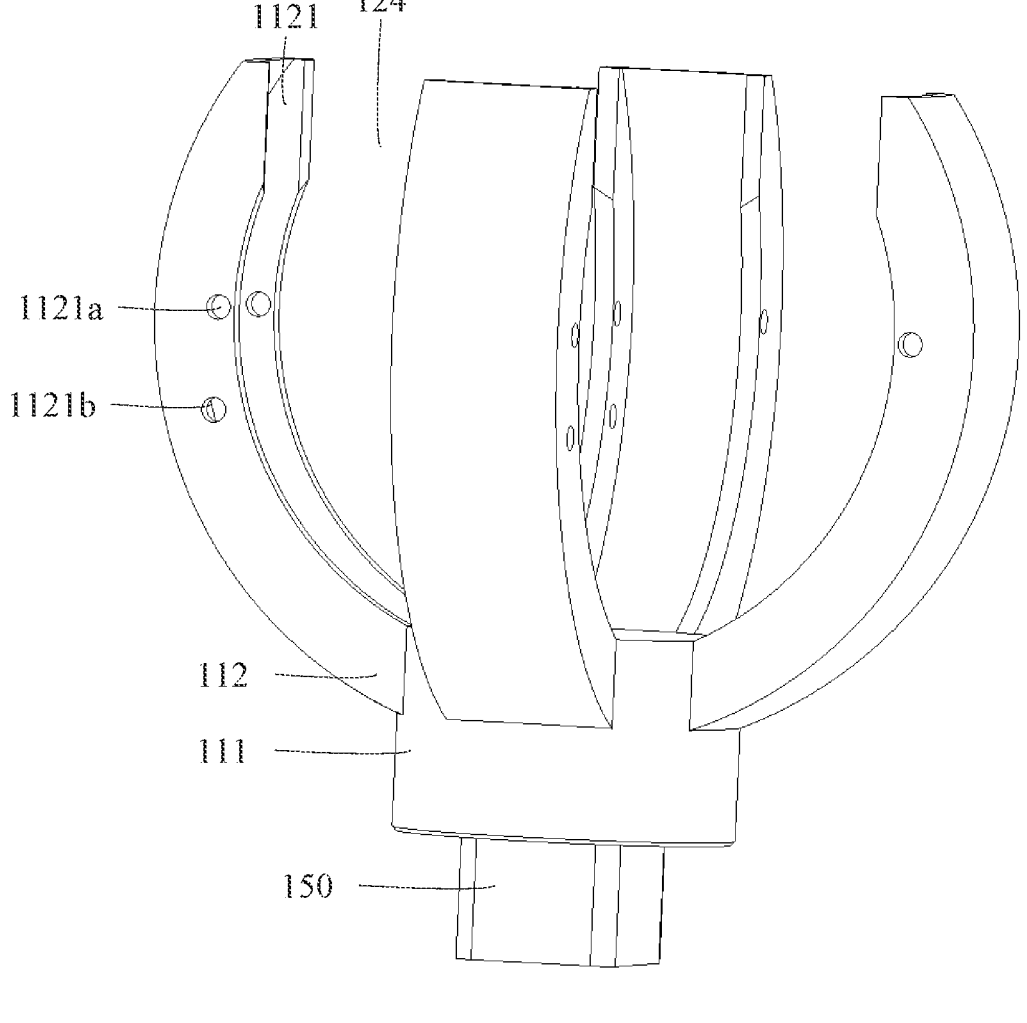
FIG. 10 is a schematic structural diagram of a bracket body of a camera assembly according to an embodiment of this application.
Figure 11:
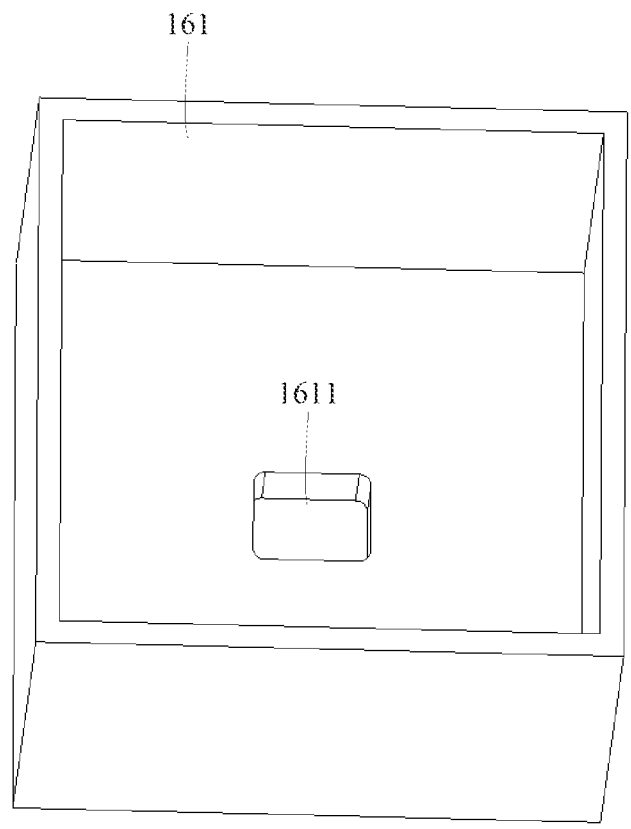
FIG. 11 is a schematic structural diagram of a base of a camera assembly according to an embodiment of this application.
Figure 12:
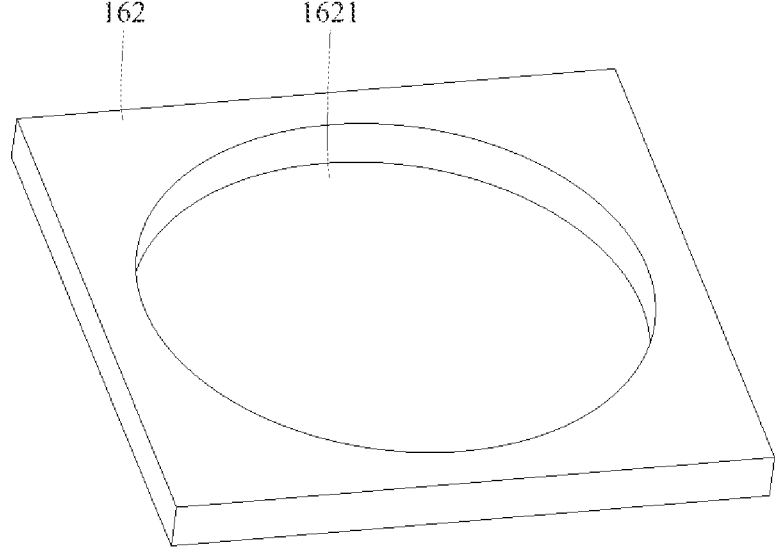
FIG. 12 is a schematic structural diagram of a top cover of a camera assembly according to an embodiment of this application.

Further description is made based on FIG. 3 and FIG. 4. FIG. 3 is a schematic diagram of the camera assembly 100 without any shaking, where a ray of light vertically enters the camera 140. However, when the camera 140 experiences shaking, the ray of light that enters the camera 140 tilts, making the shot picture blurry. As shown in FIG. 4, when the camera 140 experiences shaking, the first driving mechanisms 130 disposed opposite each other drive the spherical part 120 to rotate towards a side to which the ray of light tilts, so that the camera 140 rotates towards the side to which the ray of light tilts, ensuring that the incident ray of light remains perpendicular to the camera 140. As a result, the picture shot by the camera 140 is clear.

In another optional embodiment, at least four first driving mechanisms 130 may be provided, among which two opposite first driving mechanisms 130 may drive the spherical part 120 to rotate around a first axis, and another two opposite first driving mechanisms 130 may drive the spherical part 120 to rotate around a second axis. The first axis may intersect the second axis, and both the first axis and the second axis may intersect an optical axis of the camera 140.

In this solution, at least two sets of first driving mechanisms 130 disposed opposite each other can implement rotation of the camera 140 in at least two directions. This increases the rotation range of the camera 140, thereby expanding the shake adjustment range of the camera 140 and further enhancing the anti-shake function of the camera 140.

Specifically, four first driving mechanisms 130 are provided, which are a first driving sub-mechanism, a second driving sub-mechanism, a third driving sub-mechanism, and a fourth driving sub-mechanism. The first driving sub-mechanism, the second driving sub-mechanism, the third driving sub-mechanism, and the fourth driving sub-mechanism are disposed around the spherical part 120 successively. In this case, the first driving sub-mechanism is disposed opposite the third driving sub-mechanism, and the second driving sub-mechanism is disposed opposite the fourth driving sub-mechanism. The first driving sub-mechanism and the third driving sub-mechanism drive the spherical part 120 to rotate around the first axis, and the second driving sub-mechanism and the fourth driving sub-mechanism drive the spherical part 120 to rotate around the second axis. A line connecting the center of the rolling element 131 of the second driving sub-mechanism and the center of the rolling element 131 of the fourth driving sub-mechanism is the first axis. A line connecting the center of the rolling element 131 of the first driving sub-mechanism and the center of the rolling element 131 of the third driving sub-mechanism is the second axis.

To further improve the anti-shake performance of the camera 140, in another optional embodiment, the camera assembly 100 may further include a second driving mechanism 150. The second driving mechanism 150 is connected to the bracket body 110, and the second driving mechanism 150 can drive the bracket body 110 to rotate around the optical axis. In this solution, the second driving mechanism 150 drives the bracket body 110 to rotate, and the bracket body 110 drives the spherical part 120 and the camera 140 to rotate together, so that anti-shaking of the camera 140 along the optical axis can be implemented, further improving the anti-shake performance of the camera 140.

In the foregoing solution, the camera 140 can rotate around the first axis, the second axis, and the optical axis separately. Therefore, triaxial anti-shaking of the camera 140 can be implemented, increasing the shake adjustment range of the camera 140, further enhancing the anti-shake function of the camera 140, and further improving shooting quality of the camera 140.

In an optional solution, the first axis, the second axis, and the optical axis are perpendicular to each other.

This application discloses a specific structure of the bracket body 110. Certainly, the bracket body 110 may alternatively be of other structures. This is not limited herein. Specifically, the bracket body 110 may include a supporting part 111 and a plurality of arc-shaped extension parts 112. The plurality of arc-shaped extension parts 112 may be spaced apart along a circumferential direction of the supporting part 111. The plurality of arc-shaped extension parts 112 and the supporting part 111 may enclose the accommodation space 124, and the driving sources 132 may be disposed on the arc-shaped extension parts 112.

In this solution, the bracket body 110 is of a claw structure. In this case, the bracket body 110 can support the spherical part 120. Further, the claw structure has a light weight and small size, allowing the camera assembly 100 to be light and small. In addition, the claw structure requires less material, resulting in low production costs. Further, the claw structure is easy to assemble.

Optionally, each arc-shaped extension part 112 may be provided with at least one first driving mechanism 130. The arc-shaped extension parts 112 are disposed concentrically with the spherical part 120, meaning that the center of each arc-shaped extension part 112 coincides with the center of sphere of the spherical part 120. In this case, a curvature of the arc-shaped extension part 112 is the same as that of the spherical surface 123. Therefore, during rotation of the rolling elements 131, the rolling elements 131 can remain in close contact with the spherical surface 123, preventing detachment of the rolling elements 131 from the spherical part 120, thereby improving reliability of the camera assembly 100.

To make assembly of the bracket body 110 and the spherical part 120 more convenient, in another optional solution, the supporting part 111 may be rotationally connected to the arc-shaped extension parts 112. In this case, the supporting part 111 and the arc-shaped extension parts 112 are able to rotate. During assembly of the bracket body 110 and the spherical part 120, the arc-shaped extension parts 112 can be rotated to increase the opening area of the accommodation space 124 formed by the plurality of arc-shaped extension parts 112, allowing for easier placement of the spherical part 120 into the accommodation space 124. After the spherical part 120 is placed into the accommodation space, the arc-shaped extension parts 112 are rotated so that the rolling elements 131 come into contact with the spherical part 120. In this case, the opening area of the opening of the accommodation space 124 is decreased. Then, the arc-shaped extension parts 112 are fastened to the supporting part 111, to complete assembly of the bracket body 110 and the spherical part 120.

Optionally, buckles may be disposed between the supporting part 111 and the arc-shaped extension parts 112. In a case that the buckles are open, the supporting part 111 and the arc-shaped extension parts 120 can rotate relative to each other. In a case that the buckles are closed, the supporting part 111 and the arc-shaped extension parts 112 are fastened relative to each other, prevent separation between the spherical part 120 and the rolling elements 131 during the anti-shake process of the camera assembly 100.

Certainly, the supporting part 111 may be fixedly connected to the arc-shaped extension parts 112 in other manners, for example, magnetic connection, threaded connection, and elastic connection. This is not limited herein.

In another optional embodiment, the arc-shaped extension part 112 may be provided with an accommodation groove 1121 on a side facing the spherical part 120. An extension direction of the accommodation groove 1121 may be the same as an extension direction of the arc-shaped extension part 112. The driving source 132 may be disposed in the accommodation groove 1121, and the rolling element 131 may be partially located in the accommodation groove 1121. In this solution, the accommodation groove 1121 is provided on the arc-shaped extension part 112, which can reduce the overall weight of the bracket body 110, thereby reducing the overall weight of the camera assembly 100. This is beneficial for reducing the weight of the electronic device. In addition, the driving source 132 may be disposed in the accommodation groove 1121, which can prevent interference between the driving source 132 and the spherical part 120, thereby improving safety of the spherical part 120 during rotation. Further, the rolling element 131 is in the accommodation groove 1121, which can reduce thickness of a component formed by the rolling element 131 and the arc-shaped extension part 112, thereby facilitating miniaturization of the camera assembly 100.

In another optional embodiment, first mounting holes 1121*a* may be provided on two opposite side walls of the accommodation groove 1121, a rotating shaft 134 may be disposed on two opposite sides of the rolling element 131, a central axis of the rotating shaft 134 coincides with a rotation axis of the rolling element 131, and the rotating shaft 134 is threaded into the first mounting holes 1121*a*. In this case, the rotating shaft 134 is configured to support the rolling element 131.

A second mounting hole 1121*b* may be provided on a side wall of the accommodation groove 1121, and a driving shaft of the driving source 132 may be threaded into the second mounting hole 1121*b*.

The first driving mechanism 130 may further include a transmission belt 133. The transmission belt 133 may sleeve the driving shaft and the rotating shaft 134. The driving shaft may drive rotation of the rotating shaft 134 via the transmission belt 133, and the rotating shaft 134 may drive rotation of the rolling element 131.

In this solution, the driving shaft and the rotating shaft 134 are in a transmission connection via the transmission belt 133. The transmission belt 133 has a simple structure and is easy to install, making the camera assembly 100 simpler in structure and easier to assemble.

Certainly, the driving shaft and the rotating shaft 134 may alternatively use a gear set for transmission. A first gear may be disposed on the driving shaft, a second gear may be disposed on the rotating shaft 134, and the first gear and the second gear mesh with each other to implement the transmission connection of the driving shaft and the rotating shaft 134. Certainly, the driving shaft and the rotating shaft 134 may alternatively use other transmission components. This is not limited herein.

In the foregoing embodiment, the spherical part 120 is prone to friction with the bracket body 110 during rotation, which can result in a relatively small rotation angle of the spherical part 120, leading to poor anti-shake performance of the camera 140.

In view of this, in another optional embodiment, the spherical part 120 may be provided with a first plane 121, a second plane 122, and the spherical surface 123. The spherical surface 123 may be located between the first plane 121 and the second plane 122. The camera 140 is disposed on the first plane 121. The second plane 122 is disposed opposite the supporting part 111, and there is an assembling clearance between the second plane 122 and the supporting part 111.

In this solution, a surface that faces the supporting part 111 is a plane, and there is an assembling clearance between that plane and the supporting part 111. Therefore, the supporting part 111 is not prone to friction with the spherical part 120, resulting in good anti-shake performance of the camera 140.

In addition, for the spherical part 120 in this solution, it is equivalent that a part is cut off from two opposite sides of the sphere. Therefore, the spherical part 120 has a relatively small volume and light weight, further reducing the weight of the camera assembly 100.

In the foregoing embodiment, the spherical part 120 and the rolling element 131 are likely to slide relative to each other, causing the rotation axis of the spherical part 120 to skew, which affects the anti-shake performance of the camera 140.

In view of this, in another optional embodiment, the spherical part 120 may have a first side and a second side that are provided back to back. The camera 140 may be disposed on the first side. The spherical surface 123 may be provided with an arc-shaped guide groove 1231 extending from the first side to the second side. The arc-shaped guide groove 1231 is provided in plurality, and the plurality of arc-shaped guide grooves 1231 are symmetrically distributed around the optical axis of the camera 140. The rolling element 131 may be partially located in the arc-shaped guide groove 1231, and is in contact with a groove wall of the arc-shaped guide groove 1231. In this solution, the arc-shaped guide grooves 1231 can play a role of guiding and positioning the rolling element 131, preventing relative sliding of the rolling element 131 and the spherical part 120, and making the rotation axis of the spherical part 120 less likely to skew, thereby improving the anti-shake property of the camera 140.

In another optional embodiment, the camera assembly 100 may further include a module housing 160. The module housing 160 may be provided with an inner cavity and a through hole 1621 communicating with the inner cavity. The bracket body 110, the spherical part 120, and the second driving mechanism 150 may all be located in the inner cavity, the second driving mechanism 150 may be disposed on the module housing 160, and the camera 140 may be disposed opposite the through hole 1621. In this solution, the module housing 160 can play a role of protecting components such as the bracket body 110, the spherical part 120, and the second driving mechanism 150, preventing damage to the components such as the bracket body 110, the spherical part 120, and the second driving mechanism 150, and improving safety performance of the camera assembly 100.

Further, the module housing 160 may include a base 161 and a top cover 162 that are detachably connected. The base 161 and the top cover 162 may enclose the inner cavity. The through hole 1621 may be provided in the top cover 162. The base 161 may be provided with a third mounting hole 1611, and the second driving mechanism 150 may be partially located in the third mounting hole 1611. In this solution, the base 161 and the top cover 162 are detachably connected. Therefore, when the bracket body 110 needs to be mounted into the module housing 160, the top cover 162 may be removed first, and after the bracket body 110 is mounted into the base 161, the base 161 is covered with the top cover 162, making assembling of camera assembly 100 simpler.

Optionally, the top cover 162 and the base 161 may be connected by snap-fitting, bonding, welding, or the like. A specific connection manner of the top cover 162 and the base 161 is not limited herein.

In another optional embodiment, the rolling element 131 may be a sphere. The sphere has a small contact area with the spherical part 120. Therefore, during multi-axis rotation, friction of the sphere is relatively small, facilitating the rotation.

Certainly, the rolling element 131 may alternatively be a disc, a cylinder, or of other structures. A specific structure of the rolling element 131 is not limited herein.

In another optional embodiment, an anti-slip part may be further provided on a surface of the rolling element 131 and a surface of the spherical part 120 to increase the friction between the rolling element 131 and the spherical part 120, preventing slipping of the rolling element 131 and the spherical part 120, and improving reliability of movement of the spherical part 120.

Optionally, the anti-slip part may be anti-slip paint that is applied on the surface of the rolling element 131 and the surface of the spherical part 120, or knurling may be provided on the surface of the spherical part 120 and the surface of the rolling element 131, to increase the friction between the rolling element 131 and the spherical part 120. Certainly, the friction between the rolling element 131 and the spherical part 120 may alternatively be increased in other manners. This is not limited herein.

Based on the camera assembly 100 disclosed in the embodiments of this application, an embodiment of this application further discloses an electronic device. The electronic device disclosed includes the camera assembly 100 according to any one of the foregoing embodiments.

The electronic device disclosed in this embodiment of this application may be a smartphone, a tablet computer, an e-book reader, a wearable device (for example, a smart watch), a game console, or the like. A specific type of the electronic device is not limited in this embodiment of this application.

The embodiments of this application are described above in conjunction with the drawings, but this application is not limited to the preceding implementations. The preceding implementations are merely illustrative and not limiting. In light of this application, without departing from the spirit of this application and the scope of the claims, a person of ordinary skill in the art can make many forms, all of which fall within the scope of this application.

What is claimed is:

1. A camera assembly, comprising a bracket body, a spherical part, a first driving mechanism, and a camera, wherein the bracket body is provided with an accommodation space, the spherical part is at least partially located in the accommodation space, and the camera is disposed on the spherical part;

the first driving mechanism is provided in plurality, the plurality of first driving mechanisms being spaced apart along a circumferential direction of the spherical part, and the first driving mechanism comprises a rolling element and a driving source, wherein the driving source is disposed on the bracket body, the driving source is connected to the rolling element, the driving source drives the rolling element to rotate, and the rolling element is in contact with a spherical surface of the spherical part and rolls relative to the spherical surface; and the rolling elements of the first driving mechanisms disposed opposite each other rotate in opposite directions, the first driving mechanisms disposed opposite each other drive the spherical part to rotate, and the spherical part drives the camera to rotate;

wherein at least four first driving mechanisms are pro- vided, wherein two of the first driving mechanisms disposed opposite each other drive the spherical part to rotate around a first axis, and the other two of the first driving mechanisms disposed opposite each other drive the spherical part to rotate around a second axis, wherein the first axis intersects the second axis, and both the first axis and the second axis intersect an optical axis of the camera;

wherein the camera assembly further comprises a second driving mechanism, the second driving mechanism is connected to the bracket body, and the second driving mechanism drives the bracket body to rotate around the optical axis.

2. The camera assembly according to claim 1, wherein the bracket body comprises a supporting part and a plurality of arc-shaped extension parts, the plurality of arc-shaped extension parts are spaced apart along a circumferential direction of the supporting part, the plurality of arc-shaped extension parts and the supporting part enclose the accom- modation space, and the driving source is disposed on the arc-shaped extension part.

3. The camera assembly according to claim 2, wherein the arc-shaped extension part is provided with an accommoda- tion groove on a side facing the spherical part, an extension direction of the accommodation groove is the same as an extension direction of the arc-shaped extension part, the driving source is disposed in the accommodation groove, and the rolling element is partially located in the accommo- dation groove.

4. The camera assembly according to claim 3, wherein first mounting holes are provided on two opposite side walls of the accommodation groove, a rotating shaft is disposed on two opposite sides of the rolling element, a central axis of the rotating shaft coincides with a rotation axis of the rolling element, and the rotating shaft is threaded into the first mounting holes; a second mounting hole is provided on a side wall of the accommodation groove, and a driving shaft of the driving source is threaded into the second mounting hole; and the first driving mechanism further comprises a transmission belt, the transmission belt sleeves the driving shaft and the rotating shaft, the driving shaft drives rotation of the rotating shaft via the transmission belt, and the rotating shaft drives the rolling element to rotate.

5. The camera assembly according to claim 1, wherein the spherical part has a first side and a second side provided back to back, the camera is disposed on the first side, the spherical surface is provided with an arc-shaped guide groove extending from the first side to the second side, the arc-shaped guide groove is provided in plurality, the plurality of arc-shaped guide grooves are symmetrically distrib- uted along an optical axis of the camera, and the rolling element is partially located in the arc-shaped guide groove and is in contact with a groove wall of the arc-shaped guide groove.

6. The camera assembly according to claim 1, wherein the camera assembly further comprises a module housing, the module housing is provided with an inner cavity and a through hole communicating with the inner cavity, the bracket body, the spherical part, and the second driving mechanism are all located in the inner cavity, the second driving mechanism is disposed on the module housing, and the camera is disposed opposite the through hole.

7. The camera assembly according to claim 6, wherein the module housing comprises a base and a top cover that are detachably connected, the base and the top cover enclose the inner cavity, the through hole is provided in the top cover, the base is provided with a third mounting hole, and second driving mechanism is partially located in the third mounting hole.

8. An electronic device, comprising a camera assembly, wherein the camera assembly comprises a bracket body, a spherical part, a first driving mechanism, and a camera, wherein the bracket body is provided with an accommodation space, the spherical part is at least partially located in the accommodation space, and the camera is disposed on the spherical part;

the first driving mechanism is provided in plurality, the plurality of first driving mechanisms being spaced apart along a circumferential direction of the spherical part, and the first driving mechanism comprises a rolling element and a driving source, wherein the driving source is disposed on the bracket body, the driving source is connected to the rolling element, the driving source drives the rolling element to rotate, and the rolling element is in contact with a spherical surface of the spherical part and rolls relative to the spherical surface; and the rolling elements of the first driving mechanisms disposed opposite each other rotate in opposite direc- tions, the first driving mechanisms disposed opposite each other drive the spherical part to rotate, and the spherical part drives the camera to rotate;

wherein at least four first driving mechanisms are pro- vided, wherein two of the first driving mechanisms disposed opposite each other drive the spherical part to rotate around a first axis, and the other two of the first driving mechanisms disposed opposite each other drive the spherical part to rotate around a second axis, wherein the first axis intersects the second axis, and both the first axis and the second axis intersect an optical axis of the camera;

wherein the camera assembly further comprises a second driving mechanism, the second driving mechanism is connected to the bracket body, and the second driving mechanism drives the bracket body to rotate around the optical axis.

9. The electronic device according to claim 8, wherein the bracket body comprises a supporting part and a plurality of arc-shaped extension parts, the plurality of arc-shaped extension parts are spaced apart along a circumferential direction of the supporting part, the plurality of arc-shaped extension parts and the supporting part enclose the accom- modation space, and the driving source is disposed on the arc-shaped extension part.

10. The electronic device according to claim 9, wherein the arc-shaped extension part is provided with an accom- modation groove on a side facing the spherical part, an extension direction of the accommodation groove is the same as an extension direction of the arc-shaped extension part, the driving source is disposed in the accommodation groove, and the rolling element is partially located in the accommodation groove.

11. The electronic device according to claim 10, wherein first mounting holes are provided on two opposite side walls of the accommodation groove, a rotating shaft is disposed on two opposite sides of the rolling element, a central axis of the rotating shaft coincides with a rotation axis of the rolling element, and the rotating shaft is threaded into the first mounting holes;

a second mounting hole is provided on a side wall of the accommodation groove, and a driving shaft of the driving source is threaded into the second mounting hole; and the first driving mechanism further comprises a transmission belt, the transmission belt sleeves the driving shaft and the rotating shaft, the driving shaft drives rotation of the rotating shaft via the transmission belt, and the rotating shaft drives the rolling element to rotate.

12. The electronic device according to claim 8, wherein the spherical part has a first side and a second side provided back to back, the camera is disposed on the first side, the spherical surface is provided with an arc-shaped guide groove extending from the first side to the second side, the arc-shaped guide groove is provided in plurality, the plurality of arc-shaped guide grooves are symmetrically distributed along an optical axis of the camera, and the rolling element is partially located in the arc-shaped guide groove and is in contact with a groove wall of the arc-shaped guide groove.

13. The electronic device according to claim 8, wherein the camera assembly further comprises a module housing, the module housing is provided with an inner cavity and a through hole communicating with the inner cavity, the bracket body, the spherical part, and the second driving mechanism are all located in the inner cavity, the second driving mechanism is disposed on the module housing, and the camera is disposed opposite the through hole.

14. The electronic device according to claim 13, wherein the module housing comprises a base and a top cover that are detachably connected, the base and the top cover enclose the inner cavity, the through hole is provided in the top cover, the base is provided with a third mounting hole, and the second driving mechanism is partially located in the third mounting hole.

* * * * *